(12) United States Patent
Righi et al.

(10) Patent No.: US 9,734,311 B1
(45) Date of Patent: Aug. 15, 2017

(54) SECURE AUTHENTICATION OF FIRMWARE CONFIGURATION UPDATES

(71) Applicant: American Megatrends Inc., Norcross, GA (US)

(72) Inventors: Stefano Righi, Lawrenceville, GA (US); Madhan B. Santharam, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 14/660,602

(22) Filed: Mar. 17, 2015

(51) Int. Cl.
*G06F 21/00* (2013.01)
*G06F 21/31* (2013.01)
*G06F 21/32* (2013.01)

(52) U.S. Cl.
CPC .............. *G06F 21/31* (2013.01); *G06F 21/32* (2013.01)

(58) Field of Classification Search
CPC ...... G06F 21/44; G06F 21/575; G06F 21/572; G06F 21/78; H04L 63/083; H04L 63/0457
USPC ........................................................... 726/17
See application file for complete search history.

(56) References Cited

U.S. PATENT DOCUMENTS

| | | | | |
|---|---|---|---|---|
| 8,775,781 | B2* | 7/2014 | Warkentin | G06F 9/4401 713/2 |
| 2014/0281577 | A1* | 9/2014 | Nicholes | G06F 21/71 713/189 |
| 2015/0089238 | A1* | 3/2015 | Lewis | G06F 21/44 713/183 |
| 2015/0220742 | A1* | 8/2015 | Ouyang | G06F 21/32 713/189 |

\* cited by examiner

*Primary Examiner* — Syed Zaidi
(74) *Attorney, Agent, or Firm* — Lee & Hayes, PLLC (57) ABSTRACT

A computing system firmware is provided that includes functionality for securely authenticating a user of the computing system prior to allowing the user, through an application running on an operating system, to invoke firmware functions and to access and modify firmware variables. The authentication may use the same authentication credentials used to access firmware utilities during the computing system's power-on self-test (POST) phase. Upon receiving requests to access firmware assets, an authentication service determines whether the access has been authenticated for the user. If so, access to the firmware assets is granted. If access has not been authenticated for the user, the authentication service attempts to authenticate the user by verifying the authentication credentials passed along with the request.

20 Claims, 9 Drawing Sheets

| REQUEST | NAME | VALUE | FUNCTION | |
|---|---|---|---|---|
| GET | $HII | - | OBTAIN CONTENTS OF HII DATABASE | ← 204A |
| SET | $SWSMI | 1 | UPDATE FIRMWARE IMAGE TO FLASH | ← 204B |
| SET | $SWSMI | 2 | MANAGE SYSTEM POWER USAGE | ← 204C |
| SET | $SWSMI | 3 | LEGACY CONSOLE REDIRECTION | ← 204D |
| SET | $AUTH | **** | AUTHENTICATE ACCESS | ← 204E |

SECURE AUTHENTICATION OF FIRMWARE CONFIGURATION UPDATES

BACKGROUND

In many computing systems, low-level instruction code, or firmware, is used as an intermediary between the hardware components of the computing system and high-level software executing on the computing system, such as an operating system. The firmware may provide a set of software routines that allow high-level software to interact with the hardware components of the computing system. Configuring the firmware requires the use of complex operations, tools and utilities that are platform and operating system specific. It is with respect to these and other considerations that the disclosure made herein is presented. It is with respect to these and other considerations that the various embodiments described below are presented.

SUMMARY

Concepts and technologies are disclosed herein for secure authentication of firmware configuration updates. Through an implementation of the examples disclosed herein, an application, executing on an operating system, can allow secure access to firmware variables and the invocation of virtually any type of firmware function after a user of a computing system has been authenticated. The authentication may rely on the same authentication credentials used during the power-on self-test (POST). As a result, negligent, or malicious, attempts to change the configuration of a computing system might be avoided.

According to aspects disclosed herein, a runtime authentication service may receive a request from a setup utility running on an operating system. The request may include a call to perform a unified extensible firmware interface (UEFI) runtime function to get or set a firmware variable having a variable name and a variable value. The authentication service may determine whether access to firmware assets is authenticated and, if so, the authentication service may pass the request to an access service. The access service may determine that a platform-specific firmware function has been defined that corresponds to the firmware variable and may perform the function.

According to other aspects disclosed herein, the authentication service may receive the request and determine that access to firmware assets is unauthenticated. The authentication service may authenticate the access to firmware assets by verifying that the variable name and variable value included in the request correspond to an authentication function and by setting the access to firmware access as authenticated.

It should be appreciated that the subject matter described herein may also be implemented in a computing system, as an apparatus, or as an article of manufacture such as a computer-readable storage medium. These and various other features as well as advantages will be apparent from a reading of the following detailed description and a review of the associated drawings.

DETAILED DESCRIPTION

Concepts and technologies are disclosed for secure authentication of firmware configuration updates. In the following detailed description, references are made to the accompanying drawings that form a part hereof, and in which are shown by way of illustration specific configurations or examples. Referring now to the drawings, in which like numerals represent like elements throughout the several figures, aspects of the various implementations provided herein and an exemplary operating environment will be described.

Figure 1:
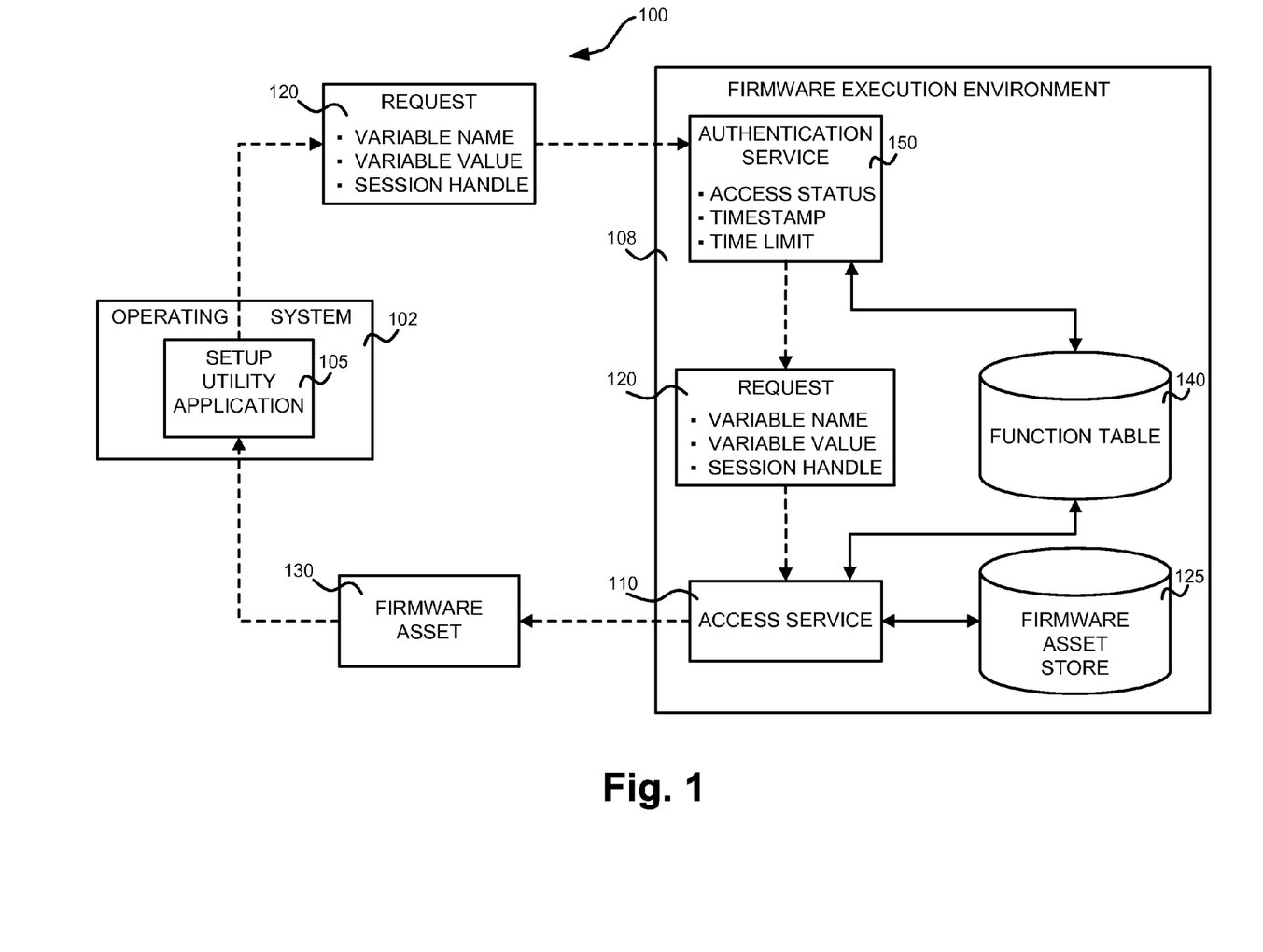
FIG. 1 is a block diagram illustrating implementations of a computing system for securely authenticating firmware configuration updates.

FIG. 1 and the following discussion are intended to provide a brief, general description of a suitable computing environment in which examples presented herein may be implemented. While the examples presented herein are described in the general context of program modules that execute in conjunction with the execution of a computer firmware, those skilled in the art will recognize that various examples may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, embedded systems, and the like. Examples presented herein may also be practiced in distributed computing environments where tasks are performed by remote processing devices that are linked through a communications network. In a distributed computing environment, program modules may be located in both local and remote memory storage devices.

Turning now to FIG. 1, a block diagram illustrating implementations of a system 100 for securely authenticating firmware configuration updates will be described. An operating system 102 may allow various applications to run on a computing system and facilitate the sharing of resources on the computing system between the various applications. The operating system 102 may utilize runtime services that operate in a firmware execution environment 108 to communicate with hardware (not pictured) connected to the computing system. In some examples, a setup utility application 105 may be among the various applications executing on top of the operating system 102. The setup utility application 105 may receive user input and configure the operation of the computing system by setting firmware variables. According to some examples, firmware variables may include firmware configuration parameters that affect the operation of the computing system. In order to perform this process, the setup utility application 105, in some examples, may utilize an access service 110 to obtain information, from a firmware asset store 125, regarding the configuration and utilization of firmware variables. The information obtained from the firmware asset store 125 would not generally be available to applications running on the operating system 102.

According to some examples, the access service 110 may be one of the runtime services executing in the firmware execution environment 108. The access service 110 may receive, from the setup utility application 105, a request 120 containing a variable name. In some examples, the request 120 may also include one or more of a variable value and a session handle. The access service 110 may service the request 120 by utilizing calls to a UEFI "Get" variable and "Set" variable runtime functions. A UEFI "Get" variable runtime function may allow an operating system 102 or an application running on an operating system 102 to retrieve a specific firmware variable that corresponds to the variable name received in the request 120. In some examples, the firmware variable, or other firmware asset 130, may be returned from the access service 110 to the setup utility application 105. A UEFI "Set" variable runtime function may allow an operating system 102 or an application running on an operating system 102 to set the value of a firmware variable associated with a particular variable name. The Get and Set runtime services may be defined by a UEFI specification.

In some examples, the access service 110 may extend the functionality of the Get and Set runtime services defined by the UEFI specification to allow the invocation of firmware functions. For example, a firmware function can be defined that corresponds to a particular firmware variable. The firmware variable may be related to the firmware function by a unique identifier. The identifier may include the variable name and the variable value, the type of request 120 (i.e., Get or Set), or a combination of these items. In some implementations, information regarding the relationship between the firmware function and its corresponding firmware variable may be stored in a function table 140 that is accessible to the access service 110.

Upon receiving a request 120 that includes a call to perform a get or set operation, the access service 110 may search the function table 140 to determine if a firmware function corresponds to the firmware variable identified in the request 120. If a corresponding firmware function is found, then, instead of performing a Get or Set operation, the corresponding firmware function may be invoked. In this manner, the access service 110 may be used to invoke firmware functions for managing system power usage, updating a firmware image, returning the contents of an HII database, and other operations.

As a runtime service, the access service 110 may be available to receive and service calls from applications running on the operating system 102. Hence, in some examples, an authentication service 150 may be used to control access to firmware assets 130 such as firmware variables and firmware functions. For instance, the authentication service 150 may filter requests 120 sent to the access service 110. The authentication service 150 may maintain an access status that indicates whether access to firmware assets 130 in the firmware asset store 125 is authenticated or unauthenticated. Upon receiving a request 120 that includes a call to perform a get or set operation, the authentication service 150 may check the access status to determine whether access to the firmware assets 130 is authenticated. In some implementations, if the access to the firmware assets 130 is authenticated, the authentication service 150 may forward the request 120 to the access service 110, where the access service 110 may service the request 120 in the manner described above.

As mentioned above, the authentication service 150 may check the access status to verify that access to the firmware assets 130 is authenticated prior to forwarding the request 120 to the access service 110. In another example, the authentication service 150 may determine whether access to the firmware assets 130 is authenticated by comparing the current system time against a timestamp maintained by the authentication service 150. If a difference between the current time and the timestamp is less than an authentication time limit, the authentication service 150 may determine that the access to the firmware assets 130 is authenticated and may forward the request 120 to the access service 110. The access service 110 may then service the request 120. If the difference between the current time and the timestamp is equal to or greater than the authentication time limit, the authentication service 150 may determine that the access to the firmware assets 130 is unauthenticated and deny passage of the request to the access service 110. In another implementation, the authentication service 150 may maintain a session handle. Upon an initial determination that access to the firmware assets 130 has been authenticated, the authentication service 150 may return, as a firmware asset 130, a session handle to the setup utility application 105. The session handle may then be included on subsequent requests 120. On subsequent requests 120, the authentication service 150 may determine whether access to the firmware assets 130 is authenticated for a particular user by comparing the value of the session handle received in the request 120 with the value of the session handle maintained by the authentication service 150. In yet other examples, the authentication service 150 may use a combination of techniques to determine whether the access to firmware assets has been authenticated, such as querying the access status and determining whether the authentication time limit has been exceeded. The disclosed mechanisms of modifying a firmware asset 130 may be utilized to allow a user of the system 100 to configure the value of the authentication time limit once access to the firmware assets 130 has been authenticated for the user.

In some implementations, if, upon receiving the request 120, the authentication service 150 determines that the access to the firmware assets 130 is unauthenticated, the authentication service 150 may search the function table 140 to determine whether the firmware variable identified in the request 120 corresponds to a firmware function for authenticating access to firmware assets 130. Upon determining that the firmware variable identified in the request 120 does correspond to the firmware function for authenticating access to the firmware assets 130, the authentication service 150 may update the access status to indicate that access to the firmware assets 130 has been authenticated. In some implementations, updating the access status to indicate that access to the firmware assets 130 has been authenticated may include updating the timestamp with the current system time. In other examples, updating the access status may include returning, as a firmware asset 130, a session handle to the setup utility application 105. It should be appreciated that the functions performed by the authentication service 150 may help to safeguard against unauthorized access to the firmware assets 130.

Figure 2:
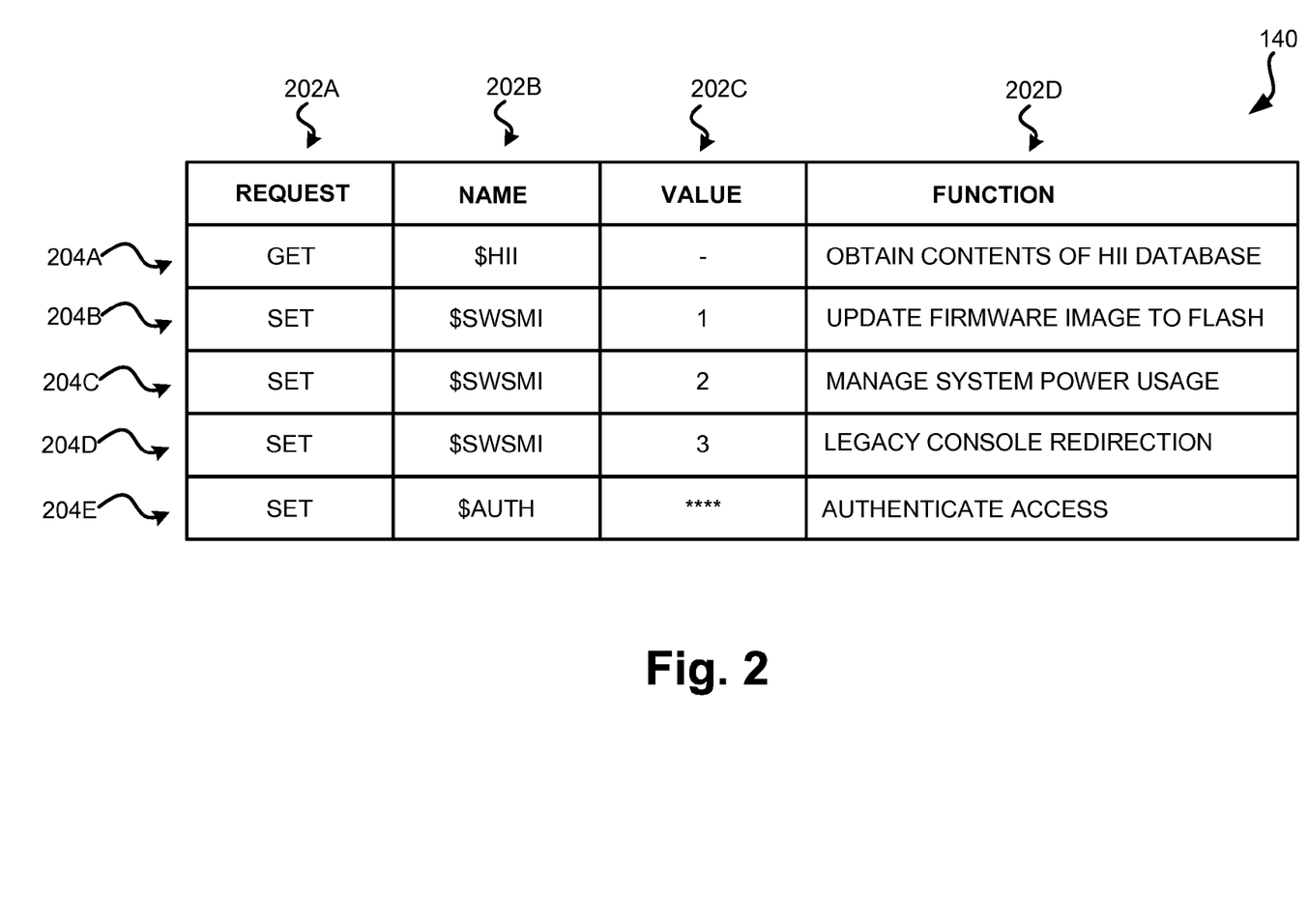
FIGS. 2 and 3 illustrate a function table and several firmware functions utilized in some examples disclosed herein.
Figure 3:
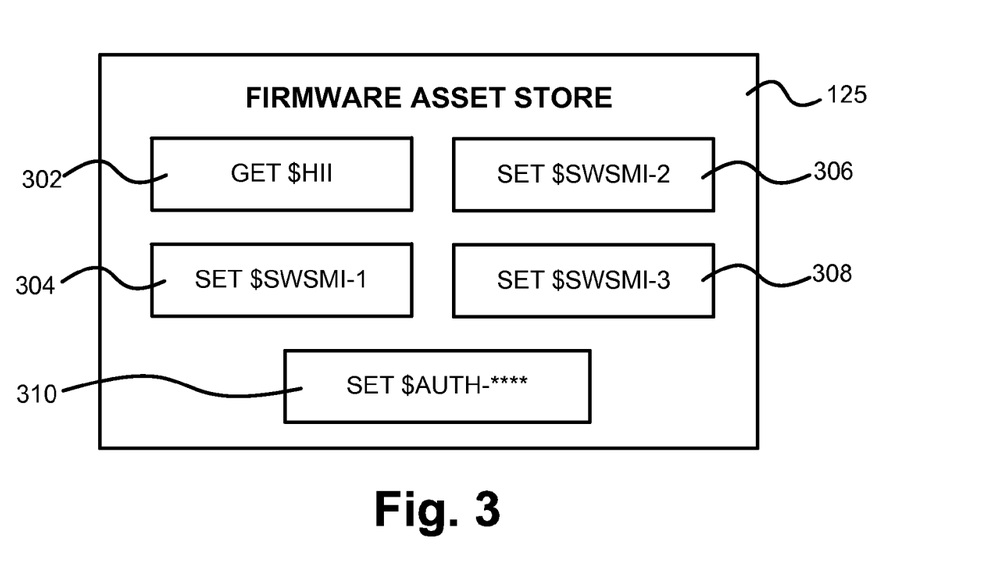

Referring now to FIGS. 2 and 3, a function table 140 and several firmware functions utilized in some examples disclosed herein will be described. As shown in FIG. 2, a function table 140 may be utilized to store information regarding the relationships between firmware functions and firmware variables. The function table 140 may include predefined variable names and associated variable values that correspond to particular platform-specific firmware functions identified in requests 120 to the access service 110 to "Get" or "Set" a firmware variable. As illustrated in FIG. 2, column 202A contains data entries for a "Get" or "Set" request 120, column 202B contains data entries for variable names, and the data entries in column 202C show variable values associated with particular variable names. Column 202D shows data entries for firmware functions that correspond to the "Get" or "Set" request 120 and associated variable names and variable values.

As shown in the function table 140, a call to Get the variable name "$HII" corresponds to the firmware function of obtaining the contents of an HII database, as shown in row 204A. In some implementations, it is not necessary to pass a variable value for a "Get" request 120. A "Set" request 120 for the variable name "$SWSMI" with variable value 1 corresponds to the function of updating a firmware image to a flash memory device, as shown in row 204B. Row 204C shows a call to "Set" a variable identified by variable name "$SWSMI" and variable value 2 as corresponding to the firmware function of managing system power usage, and row 204D shows a call to "Set" a variable name "$SWSMI" with a variable value of 3 as corresponding to a firmware function for legacy console redirection. In other examples, the variable values shown in the data entries of column 202C may be expressed in hexadecimal format. Row 204E shows a call to "Set" a variable identified by the variable name "$AUTH" and a variable value as indicated in the cell at column 202C.

In some instances, the variable value may contain a value to be compared to an authentication value used to gain access to firmware utilities during the power-on self-test (POST). The authentication value may be a password, data derived from biometric features (e.g., fingerprint, voice, retinal scan), or any other value that may be used by the firmware to identify valid users. Other firmware functions may be triggered according to particular requests 120 and identifying information such as variable names and variable values that are predefined with data entries in the function table 140.

FIG. 3 illustrates aspects of computer-executable firmware modules for performing firmware functions in an EFI runtime environment. Computer-executable modules 302, 304, 306, 308, and 310 may be stored in the firmware asset store 125. The computer-executable modules may be utilized by the access service 110 to perform specific firmware functions by way of requests 120 to get or set a firmware variable. The module 302 corresponds to the request 120 shown in row 204A to obtain the contents of a HII database.

The module 304 corresponds to the request 120 shown in row 204B to update a firmware image to a flash memory. The module 306 corresponds to the request 120 shown in row 204C to manage the power usage of a computer system, the module 308 corresponds to the request 120 shown in row 204D for legacy console redirection and the module 310 corresponds to the request 120 shown in row 204E for authenticating firmware access.

Figure 4:
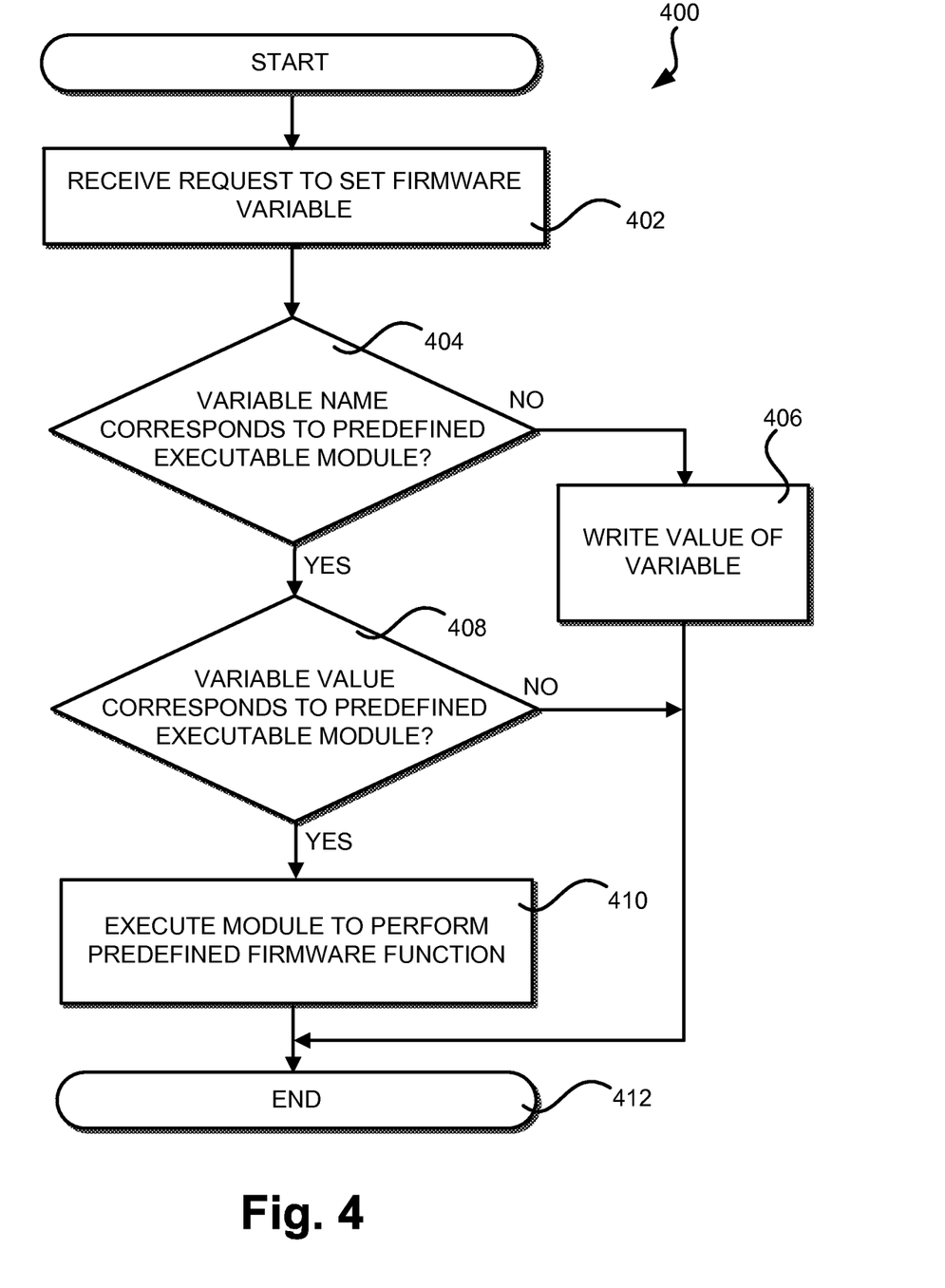
FIG. 4 is an illustrative routine for invoking a firmware function according to some configurations.

Referring now to FIG. 4, an illustrative routine 400 will be described in detail for invoking a firmware function, according to some configurations. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 400 may begin at operation 402 where a request 120 may be received at the access service 110 to set a firmware variable. For instance, the access service 110 might receive a call to the runtime service described above for setting the value of a firmware variable. The call might include a firmware variable name and a value for the firmware variable. The routine 400 may then proceed to decision operation 404.

At decision operation 404, the access service 110 may determine whether the variable name of the request 120 corresponds to a predefined firmware function that has been previously associated with the firmware variable in the manner described above. This determination may be performed by referencing the function table 140 shown in FIGS. 1 and 2 as discussed above. Other mechanisms might also be utilized in other implementations to determine whether a firmware function has been previously associated with a variable name and/or a variable value.

If the variable name specified in the Set request 120 has been previously associated with a firmware function, then the routine 400 may proceed from operation 404 to operation 408. If the variable name does not correspond to a predefined firmware function, then the routine 400 may proceed from operation 404 to decision operation 406.

At operation 406, the variable value of the request 120 is written to non-volatile memory. In this way, standard requests 120 to Set a firmware variable are processed in a standard fashion.

At decision operation 408, the access service 110 determines whether the variable value specified in the Set request 120 corresponds to a predefined firmware function by consulting the function table 140 shown in FIG. 2. If the variable value does correspond to a predefined firmware function, then the routine 400 may proceed from operation 408 to operation 410.

At operation 410, a computer-executable module that corresponds to the predefined variable name and variable value is executed in order to perform the predefined firmware function. If the variable name does not correspond to a predefined firmware function, then the routine 400 may proceed from operation 408 to an end operation 412, where the routine 400 ends.

It should be appreciated that while FIG. 4 primarily discloses the use of the Set runtime service for performing firmware functions, the Get runtime service might also be utilized in a similar fashion. In fact, virtually any runtime service that is exposed to applications and/or operating systems 102 might be utilized in a similar way. The implementations described herein, therefore, should not be read as being limited to either a Get or Set runtime service to provide the functionality disclosed herein.

Figure 5:
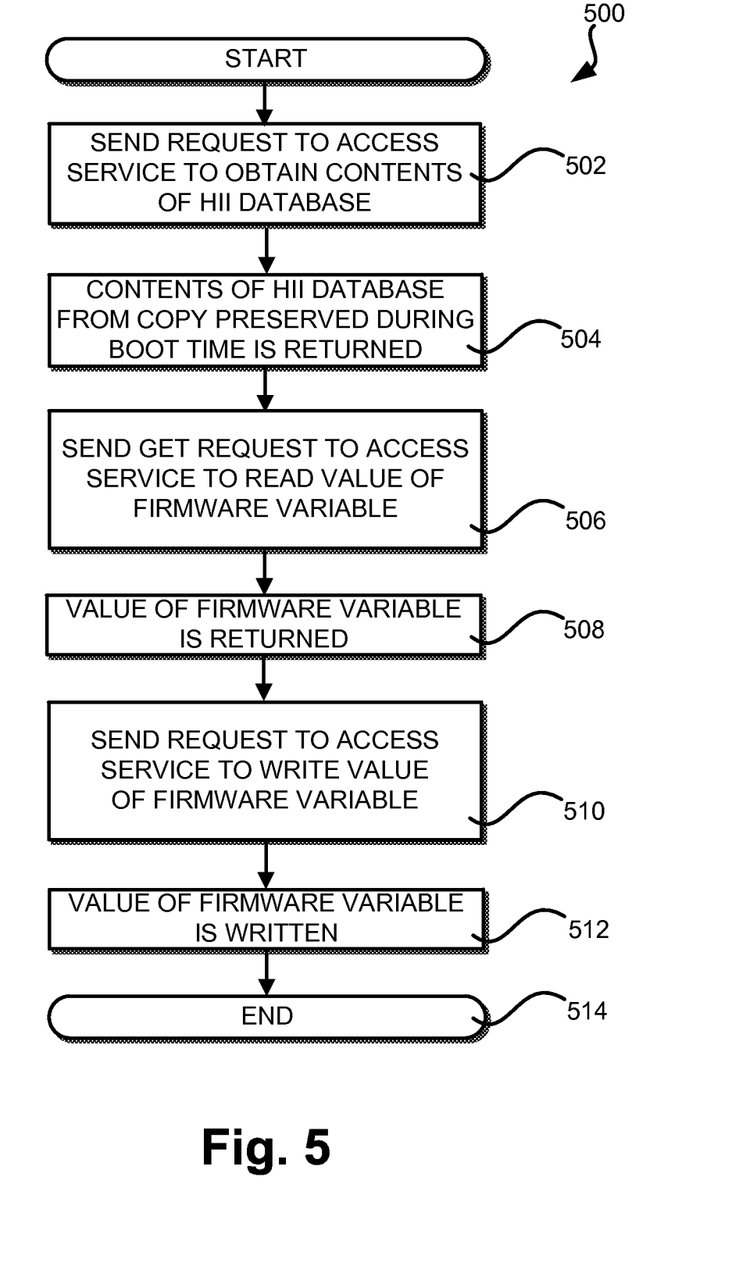
FIG. 5 is a flow diagram that illustrates aspects of the operation of a setup utility application for setting the values of firmware configuration variables.

Now referring to FIG. 5, a flow diagram that illustrates aspects of the operation of a setup utility application 105 for setting the values of configuration variables in some examples will be described. As mentioned above, the setup utility application 105 may execute on the operating system 102 and utilize the access service 110 to obtain data from the firmware asset store 125 regarding the structure and layout of firmware variables utilized by the access service 110. Additional details regarding this process will be provided below.

The routine 500 may begin at operation 502, where a Get request 120 is sent to the access service 110 to obtain all or a portion of the contents of an HII database. The request 120 may be sent by the setup utility application 105. The HII database may be stored in the firmware asset store 125. The routine 500 may begin at operation 502 where the setup utility application 105 sends a request 120 to the access service 110 to obtain all or a portion of the contents of an HII database from the firmware asset store 125. The contents of the HII database may allow the setup utility application 105 to determine the hardware/firmware specific data format needed for a request 120 to Set the value of a firmware variable.

As described above in reference to FIGS. 2 and 3, a "Get" call for the variable name "$HII" can be predefined in the function table 140 to identify a UEFI runtime function used to return the needed portion of the HII database. In one implementation, a request 120 including a call to "Get $HII" particularly corresponds to obtaining the contents of an HII database from a copy that is preserved during boot time.

From operation 502, the routine 500 may move to operation 504 where the contents of the HII database are returned from the preserved copy, which can be performed by a computer-executable Get/Set module as shown in the illustrative embodiment of FIG. 3. From operation 504, the routine 500 may proceed to operation 506.

At operation 506, a request 120 may be sent to the access service to read the value of a firmware variable. The setup utility application 105, having determined the format needed for a request 120 to read the value of the firmware variable, may properly format and send a standard runtime services Get request 120 for the value of the firmware variable. From operation 506, the routine 500 may continue to operation 508.

At operation 508, the value of the requested firmware variable may be returned. The access service 110 may invoke the Get service to read the current value of the firmware variable from the firmware asset store 125. The access service 110 may return the requested firmware asset to the setup utility application 105. From operation 508, the routine 500 may move to operation 510.

At operation 510, a request 120 to write the value of a firmware variable may be sent to the access service 110. The variable value of the request 120 may contain the desired value and the request 120 may be sent by the setup utility application 105. The request 120 may include a call to Set the value of the firmware variable to the variable value of the request 120.

From operation 510, the routine 500 may proceed to operation 512, where the value of the firmware variable may be set accordingly. The routine 500 may end at operation 514.

Figure 6:
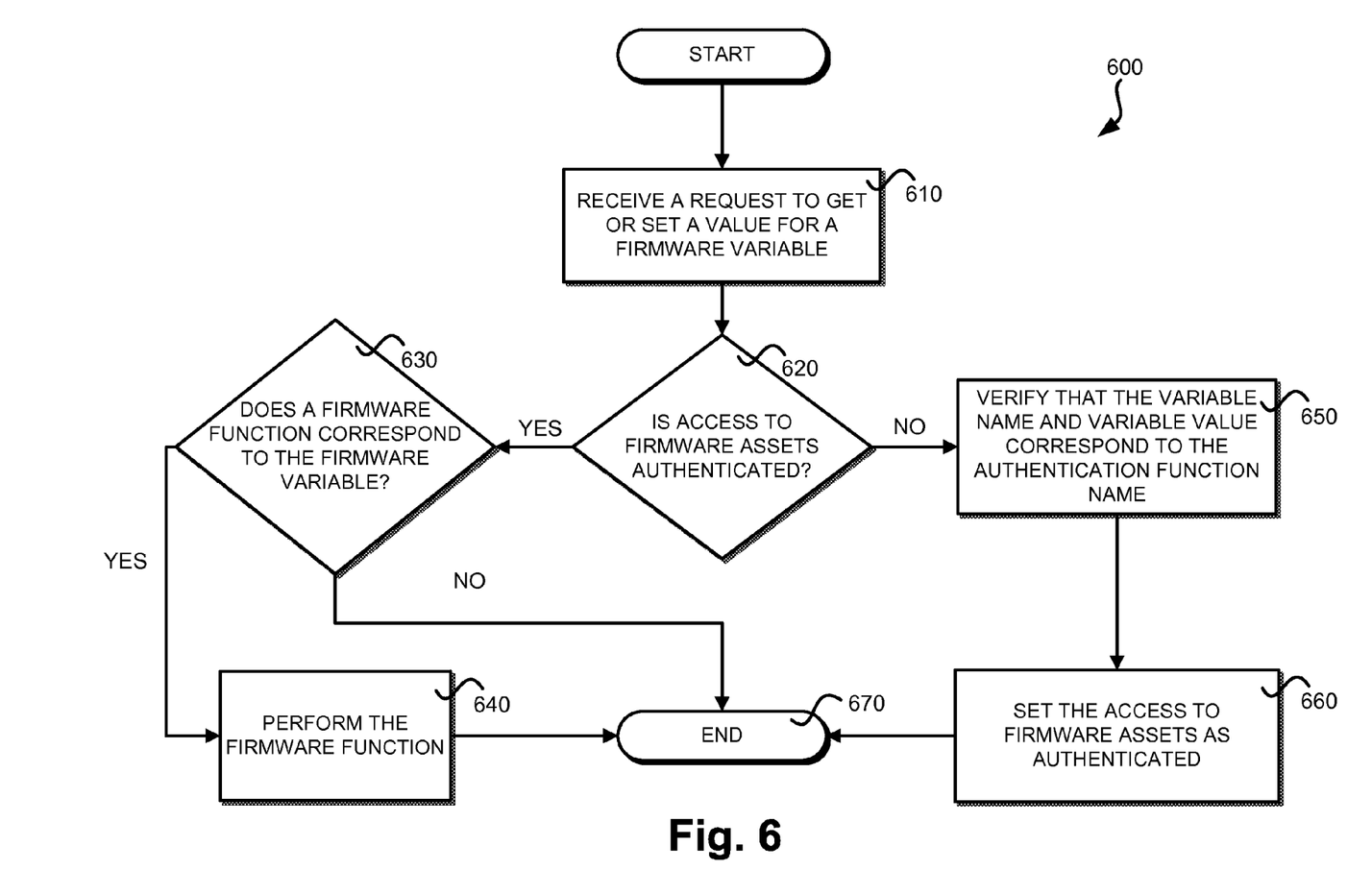
FIG. 6 is a flow diagram that illustrates a routine for authenticating access to firmware assets in some examples.

Moving now to FIG. 6, a flow diagram that illustrates a routine 600 for authenticating access to firmware assets 130 in some examples will be described. The routine 600 may begin at operation 610 where a request 120 to Get or Set a value for a firmware variable is received. The request 120 may be sent by a setup utility application 105 running on the operating system 102 of a computing system, and may be received by an authentication service 150 executing in a firmware execution environment 108. The request 120 may include a call to perform a UEFI runtime function to Get or Set the value of a firmware variable.

From operation 610, the routine 600 may proceed to decision operation 620, where the authentication service 150 may determine whether access to the firmware assets is authenticated or unauthenticated by reading the value of an access status flag. In some implementations, determining whether access to the firmware assets is authenticated or unauthenticated may include determining whether the difference between a current time and a timestamp is less than an authentication time limit. If less, then the authentication service 150 may determine that access to the firmware assets is authenticated. If the difference is greater than the authentication time limit, the authentication service 150 may determine that access to the firmware assets is unauthenticated. In yet other implementations, the authentication service 150 may determine whether access to the firmware assets is authenticated by comparing a value of a session handle received in the authentication value of the request 120 with a session handle value maintained by the authentication service 150. If the authentication service 150 determines the access status is authenticated, the routine 600 may proceed from operation 620 to operation 630.

At decision operation 630, a determination may be made as to whether a platform-specific firmware function has been defined that corresponds to the firmware variable identified in the request 120. As discussed above, the access service 110 may make this determination. If the access service 110 determines that a platform-specific firmware function that corresponds to the firmware variable has been defined, the routine 600 may proceed to operation 640, where the firmware function may be performed. From operation 640, the routine 600 may proceed to operation 670, where the routine may end.

If the authentication service 150 determines that the access status is unauthenticated, the routine 600 may proceed from operation 620 to operation 650. At operation 650, the authentication service 150 may verify that the variable name and variable value of the request 120 correspond to an authentication function. The variable value may be compared to an authentication value stored used to control access to the firmware setup utilities executing during POST operations. If the authentication service 150 determines that the variable name and the variable value correspond to an authentication function, the routine 600 may continue from operation 650 to operation 660.

At operation 660, the authentication service 150 may set the access to the firmware assets 130 as being authenticated. Setting the access to firmware assets 130 as being authenticated may include setting the access status to authenticated. In some other instances, the authentication service 150 may store the current time value to the timestamp for later comparison. From operation 660, the routine 600 may continue to operation 670, where the routine 600 may end.

Figure 7:
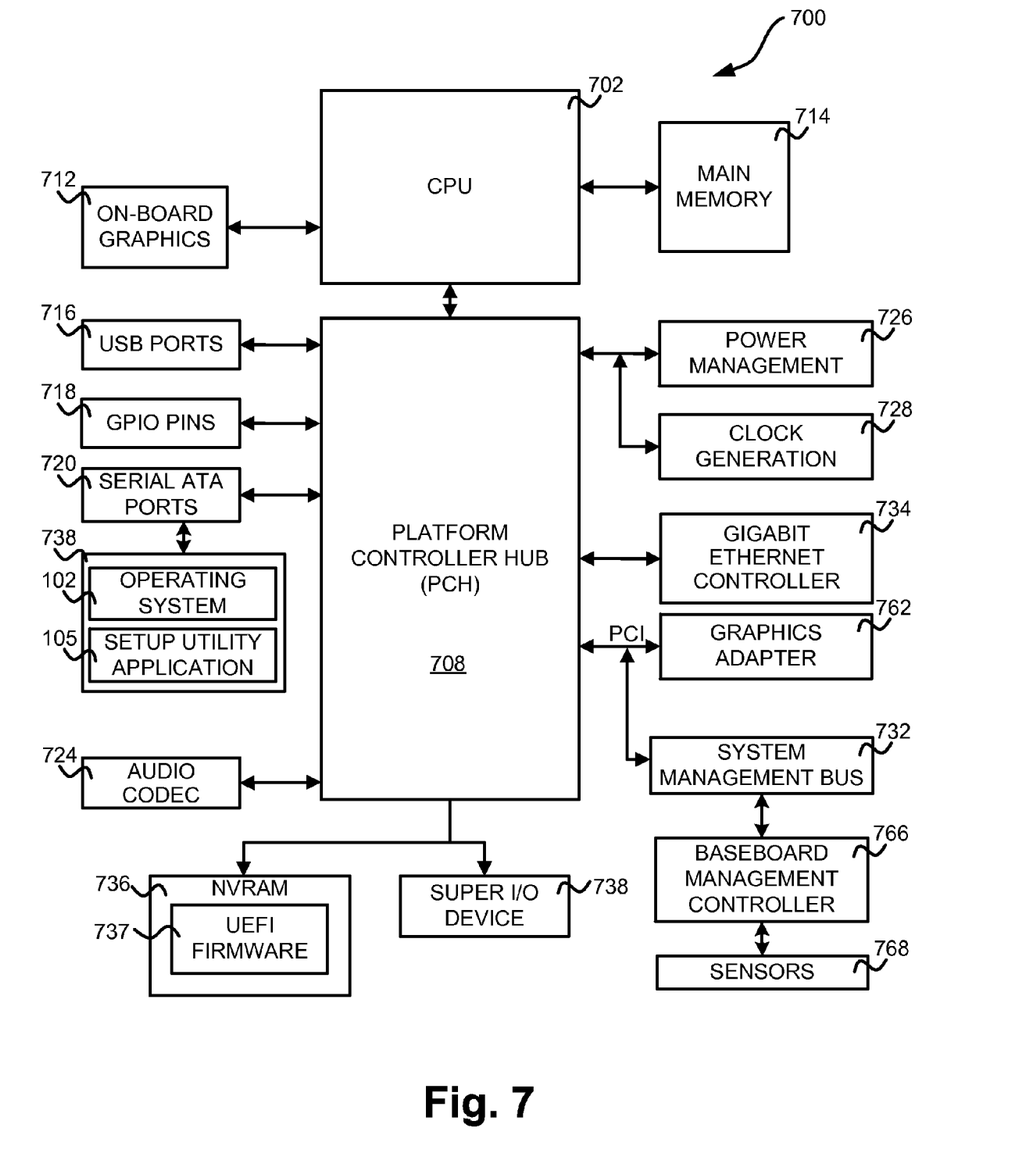
FIG. 7 is a system diagram showing aspects of an illustrative computing system for various examples of the concepts and technologies disclosed herein.

Referring now to FIG. 7, a system diagram showing aspects of an illustrative computing system 700 for various examples of the concepts and technologies disclosed herein will be described. In order to provide the functionality described herein, the computing system 700 can include a baseboard, or "motherboard," which can be a printed circuit board to which a multitude of components or devices may be connected by way of a system bus or other electrical communication path. In one illustrative embodiment, a central processing unit ("CPU") 702 operates in conjunction with a Platform Controller Hub ("PCH") 708. The CPU 702 may be a standard central processor that performs arithmetic and logical operations necessary for the operation of the computing system 700. The computing system 700 may include a multitude of CPUs 702. Each CPU 702 might include multiple processing cores.

The CPU 702 provides an interface to a random access memory ("RAM") used as the main memory 714 in the computing system 700 and, possibly, to an on-board graphics adapter 712. The PCH 708 may provide an interface between the CPU 702 and the remainder of the computing system 700.

The PCH 708 may also be responsible for controlling many of the input/output functions of the computing system 700. In particular, the PCH 708 may provide one or more universal serial bus ("USB") ports 716, an audio codec 724, a Gigabit Ethernet Controller 734, and one or more general purpose input/output ("GPIO") pins 718. The USB ports 716 may include USB 2.0 ports, USB 3.0 ports and USB 3.1 ports among other USB ports. The audio codec 724 may include Intel High Definition Audio, Audio Codec '97 ("AC'97") and Dolby TrueHD among others.

The PCH 708 may also include functionality for providing networking functionality through a Gigabit Ethernet Controller 734. The Gigabit Ethernet Controller 734 is capable of connecting the computing system 700 to another computing system via a network. Connections which may be made by the Gigabit Ethernet Controller 734 may include LAN or WAN connections. LAN and WAN networking environments are commonplace in offices, enterprise-wide computer networks, intranets, and the internet.

The PCH 708 may also provide a bus for interfacing peripheral card devices such as a graphics adapter 762. In one embodiment, the bus comprises a PCI bus. The PCI bus may include a Peripheral Component Interconnect ("PCI") bus, a Peripheral Component Interconnect eXtended ("PCI-X") bus or a Peripheral Component Interconnect Express ("PCIe") bus among others. The PCH 708 may also provide a system management bus 732 for use in managing the various components of the computing system 700.

The PCH 708 is also configured to provide one or more interfaces for connecting mass storage devices to the computing system 700. For instance, according to an embodiment, the PCH 708 includes a serial advanced technology attachment ("SATA") adapter for providing one or more serial ATA ports 720. The serial ATA ports 720 may be connected to one or more mass storage devices, such as the SATA disk drive 738, storing an operating system 102 and application programs such as the setup utility application 105. As known to those skilled in the art, an operating system 440 comprises a set of programs that control operations of a computer and allocation of resources. An application program is software that runs on top of the operating system 440 software, or other runtime environment, and uses computer resources to perform application specific tasks desired by the user.

According to some implementations, the operating system 440 comprises the LINUX operating system. According to other implementations, the operating system 440 comprises a version of the WINDOWS operating system from MICROSOFT CORPORATION. According to other implementations, the operating system 440 can comprise the UNIX, Ubuntu, or Mac OS X operating system. It should be appreciated that other operating systems may also be utilized.

The mass storage devices connected to the PCH 708, and their associated computer-readable storage media, provide non-volatile storage for the computing system 700. Although the description of computer-readable storage media contained herein refers to a mass storage device, such as a hard disk or CD-ROM drive, it should be appreciated by those skilled in the art that computer-readable storage media can be any available media that can be accessed by the computing system 700.

By way of example, and not limitation, computer-readable storage media may comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computing system 700.

A low pin count ("LPC") interface may be provided by the PCH 708 for connecting a Super I/O device 738. The Super I/O device 738 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") 736 for storing the firmware 737 that includes program code containing the basic routines that help to start up the computing system 700 and to transfer information between elements within the computing system 700. Some examples of firmware 737 include Basic Input/Output System ("BIOS"), firmware that is compatible with the Unified Extensible Firmware Interface ("UEFI"), or Open Firmware among others.

It should be appreciated that the program modules disclosed herein, including the UEFI firmware 737, may include software instructions that, when loaded into the CPU 702 and executed, transform a general-purpose computing system 700 into a special-purpose computing system 700 customized to facilitate all, or part of, the operations disclosed herein. As detailed throughout this description, the program modules may provide various tools or techniques by which the computing system 700 may participate within the overall systems or operating environments using the components, logic flows, and/or data structures discussed herein.

The CPU 702 may be constructed from any number of transistors or other circuit elements, which may individually or collectively assume any number of states. More specifically, the CPU 702 may operate as a state machine or finite-state machine. Such a machine may be transformed to a second machine, or a specific machine, by loading executable instructions contained within the program modules. These computer-executable instructions may transform the CPU 702 by specifying how the CPU 702 transitions between states, thereby transforming the transistors or other circuit elements constituting the CPU 702 from a first machine to a second machine, wherein the second machine may be specifically configured to perform the operations disclosed herein. The states of either machine may also be transformed by receiving input from one or more user input devices, network interfaces (such as the gigabit Ethernet controller 734), other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory 714 and/or 736. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the computing system 700 may comprise other types of computing devices, including hand-held computers, embedded computer systems, personal digital assistants, and other types of computing devices known to those skilled in the art. It is also contemplated that the computing system 700 may not include all of the components shown in FIG. 7, may include other components that are not explicitly shown in FIG. 7, or may utilize an architecture completely different than that shown in FIG. 7.

Figure 8:
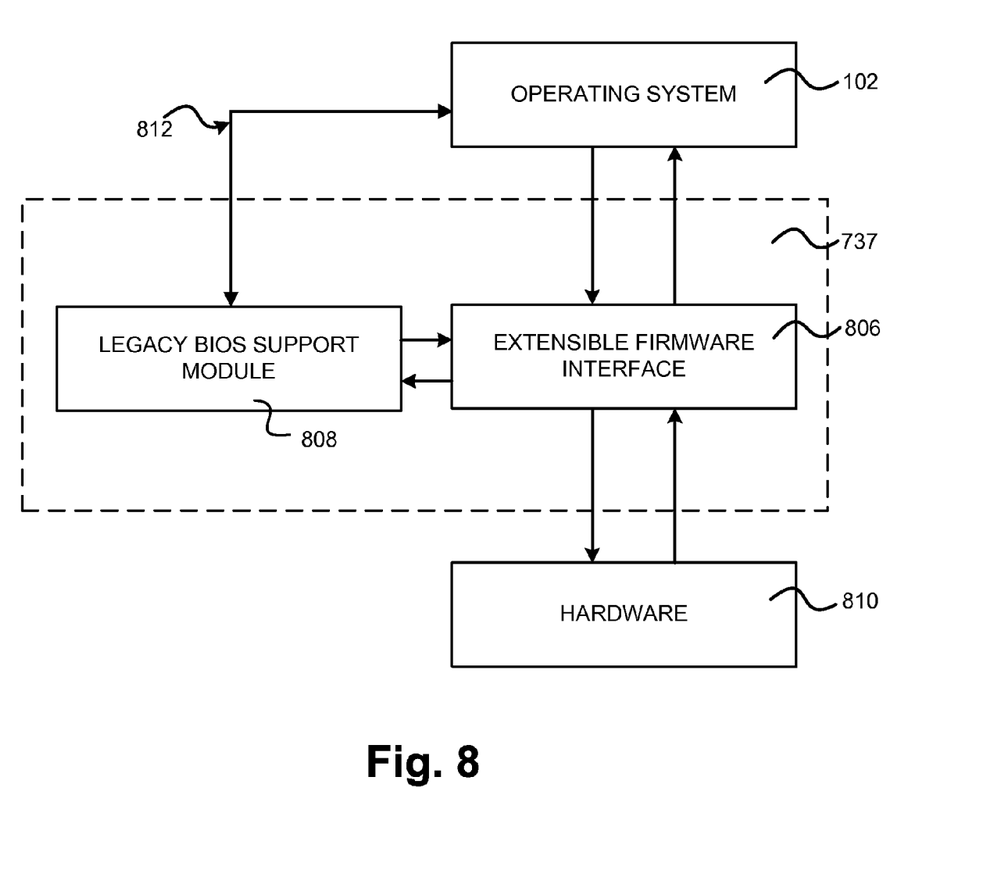
FIG. 8 is a block diagram illustrating aspects of an interface between a firmware and an operating system according to one or more examples presented herein.

Referring now to FIG. 8, a block diagram illustrates aspects of an interface between a UEFI firmware 737 and an operating system 102 according to one or more examples presented herein. As described with respect to FIG. 7, the UEFI firmware 737 may comprise a firmware compatible with the UEFI Specification from the UEFI FORUM. The UEFI Specification describes an interface between the operating system 102 and the UEFI firmware 737. The UEFI Specification also defines an interface that platform firmware may implement, and an interface that the operating system 102 may use while booting. How the UEFI firmware 737 implements the interface may be left up to the firmware manufacturer. The Specification can define a way for the operating system 102 and UEFI firmware 737 to communicate information necessary to support the operating system boot process.

According to some configurations, both a UEFI-compatible firmware 806 and a legacy BIOS support module 808 may be present in the UEFI firmware 737. This allows the computing system 700 to support a UEFI firmware interface and a legacy BIOS firmware interface. In order to provide this functionality, an interface 812 may be provided for use by legacy operating systems and applications. According to other configurations, only one of the UEFI-compatible firmware 806 and the legacy BIOS support module 808 may be present in the UEFI firmware 737. According to yet other configurations, the UEFI firmware 737 may interface with the hardware 810 through any of various other architectures, components, or modules for the UEFI firmware 737 without specific involvement of the UEFI-compatible firmware 806 or the legacy BIOS support module 808. Additional details regarding the operation and architecture of a UEFI Specification compliant-firmware can be found in the UEFI Specification and in the specifications that make up the EFI Framework, both of which are expressly incorporated herein by reference.

Figure 9:
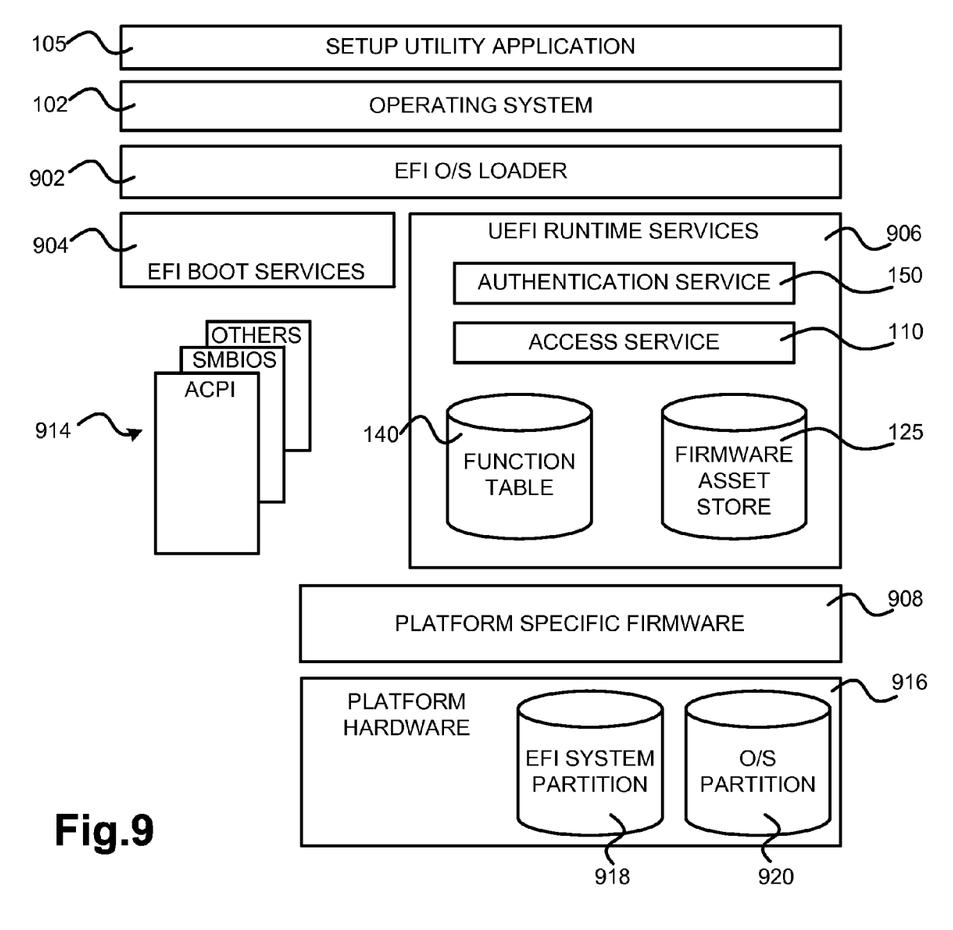
FIG. 9 is a block diagram illustrating the architecture for a UEFI specification-compliant firmware that provides an operating environment for one or more examples presented herein.

Turning now to FIG. 9, a block diagram illustrates the architecture for a UEFI specification-compliant firmware that provides an operating environment for one or more examples presented herein. As shown in FIG. 9, the architecture can include platform hardware 916 and an operating system 102. A UEFI boot loader O/S Loader 902 ("OS boot loader 902") may be loaded from the UEFI system partition 918. The OS boot loader 902 may retrieve an operating system image from the O/S partition 920.

Once started, the OS boot loader 902 may continue to boot the complete operating system 140. In doing so, the OS boot loader 902 may use boot services 904 and UEFI runtime services 906. The OS boot loader 902 may also interface to other supported specifications to survey, comprehend, and initialize the various platform components and the operating system software that manages them. Thus, interfaces 914 from other specifications may also be present on the system. For example, the Advanced Configuration and Power Management Interface ("ACPI") and the System Management BIOS ("SMBIOS") specifications may be supported.

UEFI boot services 904 may provide interfaces for devices and system functionality used during the boot phase. UEFI runtime services 906 may also be available to the UEFI boot loader 912 during the boot phase. For example, a set of runtime services may be presented to ensure appropriate abstraction of base platform hardware resources used by the operating system 102 during its operation. UEFI allows extension of platform firmware by loading UEFI driver and UEFI application images which, when loaded, have access to UEFI-defined runtime and boot services. Various program modules can provide the boot services and runtime services.

In some implementations, UEFI runtime services 906 may include the authentication service 150 and the access service 110. Through mechanisms described above, the function table 140 and firmware asset store 125 may be accessible to particular UEFI runtime services.

Based on the foregoing, it should be appreciated that technologies have been described herein provide for invoking a firmware function. Moreover, although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for invoking a platform-specific firmware function in a unified extensible firmware interface (UEFI) environment, the method comprising:
    receiving a request, by way of a UEFI firmware, to perform a UEFI runtime function to get or set a value for a firmware variable, the firmware variable comprising a variable name and a variable value;
    determining that access to firmware assets is authenticated or unauthenticated; and
    in response to determining that the access to the firmware assets is unauthenticated, authenticating the access by
        verifying that the variable name corresponds to an authentication function,
        verifying, by the authentication function, that the variable value matches an authentication value, and
        setting, based at least in part on verifying that the variable value matches the authentication value by the authentication function, an access status to the firmware assets as authenticated to enable a subsequent request to execute a subsequent UEFI runtime function.

2. The computer-implemented method of claim 1, further comprising:
    in response to determining that the access to the firmware assets is authenticated,
        determining that a platform-specific firmware function has been defined that corresponds to the firmware variable, and
        performing the platform-specific firmware function in response to determining that the platform-specific firmware function has been defined that corresponds to the firmware variable.

3. The computer-implemented method of claim 1, wherein determining that the access to the firmware assets is authenticated comprises determining that the access status is set to authenticated.

4. The computer-implemented method of claim 1, wherein determining that the access to the firmware assets is authenticated comprises determining that a difference between a current time and a timestamp associated with a time of authentication is smaller than an authentication time limit.

5. The computer-implemented method of claim 1, further comprising:
    in response to determining that the access to the firmware assets is authenticated, performing the UEFI runtime function to get or set the value for the firmware variable.

6. The computer-implemented method of claim 1, wherein determining that the access to the firmware assets is authenticated comprises determining that a value of a first session handle received in the request matches a value of a second session handle maintained by an authentication service.

7. The computer-implemented method of claim 1, wherein the variable value contains an authentication value derived from a biometric identifier.

8. A non-transitory computer-readable storage medium having stored thereon computer-executable instructions which, when executed by one or more processors, cause a computer to:
    receive a request, to perform a UEFI runtime function to get or set a value for a firmware variable;
    determine that access to firmware assets is authenticated or unauthenticated; and
    in response to determining that the access to the firmware assets is unauthenticated, authenticating the access by
        verifying that the firmware variable corresponds to an authentication function,
        verifying, by the authentication function, that the variable value matches an authentication value, and
        setting, based at least in part on verifying that the variable value matches the authentication value by the authentication function, an access status to the firmware assets as authenticated to enable a subsequent request to execute a subsequent UEFI runtime function.

9. The non-transitory computer-readable storage medium of claim 8, further comprising:
    in response to determining that the access to the firmware assets is authenticated,
        determining that a platform-specific firmware function has been defined that corresponds to the firmware variable, and
        performing the platform-specific firmware function in response to determining that the platform-specific firmware function has been defined that corresponds to the firmware variable.

10. The non-transitory computer-readable storage medium of claim 8, wherein determining that the access to the firmware assets is authenticated comprises determining that the access status is set to authenticated.

11. The non-transitory computer-readable storage medium of claim 8, wherein determining that the access to the firmware assets is authenticated comprises determining that an authentication time limit has not been reached.

12. The non-transitory computer-readable storage medium of claim 8, further comprising:
    in response to determining that the access to the firmware assets is authenticated, performing the UEFI runtime function to get or set the value for the firmware variable.

13. The non-transitory computer-readable storage medium of claim 8, wherein the value for the firmware variable contains an authentication value comprising password.

14. The non-transitory computer-readable storage medium of claim 8, wherein the value for the firmware variable comprises an authentication value derived from a biometric identifier.

15. An apparatus comprising:
    a central processing unit (CPU); and
    a non-volatile memory connected to the CPU and storing a unified extensible firmware interface (UEFI) firmware executable by the CPU, the UEFI firmware configured to, when executed,
        receive a request to get or set a value for a firmware variable,
        determine that access to firmware assets is authenticated or unauthenticated, and
        in response to determining that the access to the firmware assets is unauthenticated, authenticate the access by
            verifying that the firmware variable corresponds to an authentication function, verifying, by the authentication function, that the variable value matches an authentication value, and setting, based at least in part on verifying that the variable value matches the authentication value by the authentication function, an access status to the firmware assets as authenticated to enable a subsequent request to execute a subsequent UEFI runtime function.

16. The apparatus of claim 15, further comprising:

in response to determining that the access to the firmware assets is authenticated, determining that a platform-specific firmware function has been defined that corresponds to the firmware variable, and performing the platform-specific firmware function in response to determining that the platform-specific firmware function has been defined that corresponds to the firmware variable.

17. The apparatus of claim 15, wherein determining that the access to the firmware assets is authenticated comprises determining that the access status is set to authenticated.

18. The apparatus of claim 15, wherein determining that the access to the firmware assets is authenticated comprises determining a difference between a current time and a timestamp set upon authentication and determining that the difference is smaller than an authentication time limit.

19. The apparatus of claim 15, further comprising:

in response to determining that the access to the firmware assets is authenticated, performing a UEFI runtime function to get or set the value for the firmware variable.

20. The apparatus of claim 15, wherein the value for the firmware variable contains an authentication value comprising password.

* * * * *